(12) United States Patent
Stevens et al.

(10) Patent No.: US 12,540,997 B2
(45) Date of Patent: Feb. 3, 2026

(54) SYSTEM AND METHOD FOR APPLICATION OF DOPPLER NULL SCANNING (DNS) TO POSITION NAVIGATION TIMING (PNT)

(71) Applicant: Rockwell Collins, Inc., Cedar Rapids, IA (US)

(72) Inventors: James A. Stevens, Lucas, TX (US); Matthew D. Bousselot, Marion, IA (US); Douglas P. Burch, Cedar Rapids, IA (US); Tj T. Kwon, Marion, IA (US); William B. Sorsby, Cedar Rapids, IA (US); Eric J. Loren, North Liberty, IA (US); Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 291 days.

(21) Appl. No.: 18/200,226

(22) Filed: May 22, 2023

(65) Prior Publication Data

US 2024/0151800 A1 May 9, 2024

Related U.S. Application Data

(63) Continuation-in-part of application No. 18/199,808, filed on May 19, 2023, now Pat. No. 12,050,279, (Continued)

(51) Int. Cl.
*G01S 5/00* (2006.01)
*G01S 13/58* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ...... G01S 5/0027; G01S 13/583; G01S 13/62; G01S 2205/03; G01S 3/14; G01S 5/0284;
(Continued)

(56) References Cited

U.S. PATENT DOCUMENTS

| 3,025,519 A | 3/1962 | Brown et al. |
| 4,134,113 A | 1/1979 | Powell |

(Continued)

FOREIGN PATENT DOCUMENTS

| CN | 101330448 A | 12/2008 |
| CN | 101465793 A | 6/2009 |

(Continued)

OTHER PUBLICATIONS

U.S. Appl. No. 17/233,107, filed Apr. 16, 2021, Eric J. Loren.
(Continued)

*Primary Examiner* — Dominic E Rego
(74) *Attorney, Agent, or Firm* — Suiter Swantz IP

(57) ABSTRACT

A system may include a receiver node. The receiver node may include a communications interface and a controller. The receiver node is time synchronized with a transmitter node to apply Doppler corrections to the receiver node's own motions relative to a common reference frame. The receiver node may be configured to: The receiver node may be configured to: based at least on the receiver node being time synchronized with the transmitter node to apply Doppler corrections and the common reference frame, use Doppler null scanning (DNS) to determine DNS derived information, the DNS derived information including a bearing and the receiver node's relative position relative to the transmitter node; and output a position, navigation, and timing (PNT) solution based at least on the DNS derived information.

20 Claims, 12 Drawing Sheets

Related U.S. Application Data which is a continuation of application No. 18/198,671, filed on May 17, 2023, which is a continuation-in-part of application No. 18/198,152, filed on May 16, 2023, which is a continuation of application No. 18/196,931, filed on May 12, 2023, and a continuation-in-part of application No. 18/196,807, filed on May 12, 2023, and a continuation-in-part of application No. 18/196,765, filed on May 12, 2023, now Pat. No. 12,326,506, and a continuation-in-part of application No. 18/196,912, filed on May 12, 2023, which is a continuation-in-part of application No. 18/134,950, filed on Apr. 14, 2023, now Pat. No. 12,032,081, said application No. 18/196,807 is a continuation-in-part of application No. 18/134,950, filed on Apr. 14, 2023, now Pat. No. 12,032,081, said application No. 18/196,931 is a continuation-in-part of application No. 18/134,950, filed on Apr. 14, 2023, now Pat. No. 12,032,081, said application No. 18/196,765 is a continuation-in-part of application No. 18/134,950, filed on Apr. 14, 2023, now Pat. No. 12,032,081, said application No. 18/196,912 is a continuation-in-part of application No. 18/130,285, filed on Apr. 3, 2023, said application No. 18/196,931 is a continuation-in-part of application No. 18/130,285, filed on Apr. 3, 2023, said application No. 18/196,807 is a continuation-in-part of application No. 18/130,285, filed on Apr. 3, 2023, said application No. 18/196,765 is a continuation-in-part of application No. 18/130,285, filed on Apr. 3, 2023, which is a continuation-in-part of application No. 17/990,491, filed on Nov. 18, 2022, now Pat. No. 12,335,138, which is a continuation-in-part of application No. 17/957,881, filed on Sep. 30, 2022, and a continuation-in-part of application No. 17/941,907, filed on Sep. 9, 2022, now Pat. No. 12,316,403, which is a continuation-in-part of application No. 17/940,898, filed on Sep. 8, 2022, now Pat. No. 12,366,625, said application No. 17/957,881 is a continuation-in-part of application No. 17/857,920, filed on Jul. 5, 2022, now Pat. No. 12,287,418, said application No. 17/940,898 is a continuation-in-part of application No. 17/857,920, filed on Jul. 5, 2022, now Pat. No. 12,287,418, said application No. 17/957,881 is a continuation-in-part of application No. 17/846,625, filed on Jun. 22, 2022, said application No. 17/857,920 is a continuation-in-part of application No. PCT/US2022/024653, filed on Apr. 13, 2022, and a continuation of application No. 17/541,703, filed on Dec. 3, 2021, now Pat. No. 12,137,048, said application No. 18/134,950 is a continuation of application No. 17/534,061, filed on Nov. 23, 2021, now Pat. No. 11,665,658, said application No. 17/857,920 is a continuation of application No. 17/534,061, filed on Nov. 23, 2021, now Pat. No. 11,665,658, said application No. 17/541,703 is a continuation-in-part of application No. 17/408,156, filed on Aug. 20, 2021, now Pat. No. 11,737,121, said application No. PCT/US2022/024653 is a continuation of application No. 17/233,107, filed on Apr. 16, 2021, now Pat. No. 11,726,162, said application No. 17/541,703 is a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778.

(60) Provisional application No. 63/400,138, filed on Aug. 23, 2022, provisional application No. 63/344,445, filed on May 20, 2022.

(51) Int. Cl.
*G01S 13/62* (2006.01)
*H04W 56/00* (2009.01)

(52) U.S. Cl.
CPC ... *H04W 56/0015* (2013.01); *H04W 56/0035* (2013.01); *H04W 56/005* (2013.01)

(58) Field of Classification Search
CPC . G01S 5/12; H04W 56/0015; H04W 56/0035; H04W 56/005; G08G 5/21; G08G 5/55; G08G 5/723; G08G 5/80; G08G 5/25; G08G 5/53
See application file for complete search history.

(56) References Cited

U.S. PATENT DOCUMENTS

| | | | |
|---|---|---|---|
| 4,399,531 A | 8/1983 | Grande et al. | |
| 4,438,439 A | 3/1984 | Shreve | |
| 4,806,934 A | 2/1989 | Magoon | |
| 5,706,010 A | 1/1998 | Franke | |
| 5,835,482 A | 11/1998 | Allen | |
| 5,898,902 A | 4/1999 | Tuzov | |
| 6,008,758 A | 12/1999 | Campbell | |
| 6,072,425 A | 6/2000 | Vopat | |
| 6,111,541 A * | 8/2000 | Karmel | G01S 19/48 342/357.44 |
| 6,115,394 A | 9/2000 | Balachandran et al. | |
| 6,148,219 A | 11/2000 | Engelbrecht et al. | |
| 6,195,403 B1 | 2/2001 | Anderson et al. | |
| 6,415,154 B1 * | 7/2002 | Wang | G01S 5/0036 342/357.29 |
| 6,496,940 B1 | 12/2002 | Horst et al. | |
| 6,611,773 B2 | 8/2003 | Przydatek et al. | |
| 6,662,229 B2 | 12/2003 | Passman et al. | |
| 6,718,174 B2 | 4/2004 | Vayanos | |
| 6,721,290 B1 | 4/2004 | Kondylis et al. | |
| 6,744,740 B2 | 6/2004 | Chen | |
| 6,845,091 B2 | 1/2005 | Ogier et al. | |
| 7,023,818 B1 | 4/2006 | Elliott | |
| 7,171,476 B2 | 1/2007 | Maeda et al. | |
| 7,242,671 B2 | 7/2007 | Li et al. | |
| 7,272,472 B1 | 9/2007 | McElreath | |
| 7,299,013 B2 | 11/2007 | Rotta et al. | |
| 7,313,401 B2 * | 12/2007 | Karmel | G01S 19/071 455/457 |
| 7,343,170 B1 | 3/2008 | Feeney et al. | |
| 7,417,948 B2 | 8/2008 | Sjöblom | |
| 7,418,343 B1 | 8/2008 | McGraw et al. | |
| 7,558,575 B2 | 7/2009 | Losh et al. | |
| 7,573,835 B2 | 8/2009 | Sahinoglu et al. | |
| 7,633,921 B2 | 12/2009 | Thubert et al. | |
| 7,636,061 B1 * | 12/2009 | Thomas | G01S 5/10 342/464 |
| 7,639,652 B1 | 12/2009 | Amis et al. | |
| 7,679,551 B2 | 3/2010 | Petovello et al. | |
| 7,698,463 B2 | 4/2010 | Ogier et al. | |
| 7,719,989 B2 | 5/2010 | Yau | |
| 7,729,240 B1 | 6/2010 | Crane et al. | |
| 7,787,450 B1 | 8/2010 | Chan et al. | |
| 7,881,229 B2 | 2/2011 | Weinstein et al. | |
| 7,903,662 B2 | 3/2011 | Cohn | |
| 7,983,239 B1 | 7/2011 | Weinstein et al. | |

(56) References Cited

U.S. PATENT DOCUMENTS

| | | |
|---|---|---|
| 8,010,287 B1 | 8/2011 | Frank et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,396,686 B2 | 3/2013 | Song et al. |
| 8,490,175 B2 | 7/2013 | Barton et al. |
| 8,553,560 B2 | 10/2013 | Axelsson et al. |
| 8,587,770 B1 | 11/2013 | Johnston et al. |
| 8,599,956 B1 | 12/2013 | Mitchell |
| 8,614,997 B1 | 12/2013 | Herder |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,930,044 B1 | 1/2015 | Peeters et al. |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,213,387 B2 | 12/2015 | King et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,763,937 B2 | 9/2020 | Kusano et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,138,044 B2 | 10/2021 | Boehm et al. |
| 11,258,520 B2 | 2/2022 | Goergen et al. |
| 11,280,911 B2* | 3/2022 | Kennedy ................ G01S 19/30 |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 11,611,375 B2 | 3/2023 | Newman et al. |
| 11,929,820 B2 | 3/2024 | Khan et al. |
| 11,977,173 B2 | 5/2024 | Loren et al. |
| 12,050,279 B2 | 7/2024 | Stevens et al. |
| 12,078,732 B1* | 9/2024 | Sirianni ................ G01S 19/27 |
| 12,111,406 B2 | 10/2024 | Sorsby et al. |
| 2002/0018448 A1 | 2/2002 | Amis et al. |
| 2002/0082024 A1* | 6/2002 | Bajikar ................ H04W 64/00 |
| | | 455/456.1 |
| 2002/0173269 A1 | 11/2002 | Grayson et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0032363 A1 | 2/2004 | Schantz et al. |
| 2004/0121782 A1 | 6/2004 | Tester |
| 2004/0123228 A1 | 6/2004 | Kikuchi et al. |
| 2004/0192334 A1* | 9/2004 | McBurney ............ G01S 19/254 |
| | | 455/456.1 |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2005/0033789 A1 | 2/2005 | Sirois |
| 2005/0047347 A1 | 3/2005 | Lee et al. |
| 2005/0141545 A1 | 6/2005 | Fein et al. |
| 2005/0192058 A1 | 9/2005 | Jung et al. |
| 2005/0219950 A1 | 10/2005 | Rowe |
| 2005/0272379 A1 | 12/2005 | Rotta et al. |
| 2006/0010170 A1 | 1/2006 | Lashley et al. |
| 2006/0056421 A1 | 3/2006 | Zaki |
| 2006/0176847 A1 | 8/2006 | Chen et al. |
| 2006/0239238 A1 | 10/2006 | Fernandez-Corbaton et al. |
| 2007/0021122 A1* | 1/2007 | Lane ................ H04W 56/0025 |
| | | 455/67.16 |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0222665 A1 | 9/2007 | Koeneman |
| 2007/0223497 A1 | 9/2007 | Elson et al. |
| 2007/0299950 A1 | 12/2007 | Kulkarni |
| 2008/0068250 A1 | 3/2008 | Brandao et al. |
| 2008/0107034 A1 | 5/2008 | Jetcheva et al. |
| 2008/0117904 A1 | 5/2008 | Radha et al. |
| 2008/0158040 A1 | 7/2008 | Stayton et al. |
| 2008/0219204 A1 | 9/2008 | Lee et al. |
| 2008/0273582 A1 | 11/2008 | Gaal et al. |

(56) References Cited

U.S. PATENT DOCUMENTS

| | | |
|---|---|---|
| 2008/0291945 A1 | 11/2008 | Luo |
| 2008/0310325 A1 | 12/2008 | Yang |
| 2008/0310354 A1 | 12/2008 | Hansen et al. |
| 2009/0036144 A1 | 2/2009 | Wong et al. |
| 2009/0086713 A1 | 4/2009 | Luo |
| 2009/0203337 A1 | 8/2009 | Sisley et al. |
| 2009/0207694 A1 | 8/2009 | Guigne et al. |
| 2009/0232049 A1 | 9/2009 | Singh et al. |
| 2009/0233544 A1 | 9/2009 | Oyman et al. |
| 2009/0271054 A1 | 10/2009 | Dokken |
| 2009/0290572 A1 | 11/2009 | Gonia et al. |
| 2009/0303115 A1* | 12/2009 | Alizadeh-Shabdiz ............. G01S 19/46 342/357.29 |
| 2009/0310505 A1 | 12/2009 | Tsai et al. |
| 2009/0312038 A1 | 12/2009 | Gildea |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2010/0111065 A1 | 5/2010 | Noh et al. |
| 2010/0226450 A1 | 9/2010 | Tanaka |
| 2010/0246660 A1 | 9/2010 | Matsuo et al. |
| 2011/0006913 A1 | 1/2011 | Chen et al. |
| 2011/0013487 A1 | 1/2011 | Zhou et al. |
| 2011/0053494 A1 | 3/2011 | Kobayakawa |
| 2011/0122849 A1 | 5/2011 | Jain et al. |
| 2011/0169684 A1 | 7/2011 | Margolin |
| 2011/0188378 A1 | 8/2011 | Collins et al. |
| 2011/0199260 A1 | 8/2011 | Garrett et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2012/0168566 A1 | 7/2012 | Lee et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0130682 A1 | 5/2013 | Awad et al. |
| 2013/0135137 A1 | 5/2013 | Mulder et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2014/0340192 A1 | 11/2014 | Yamada et al. |
| 2015/0010153 A1 | 1/2015 | Robertson |
| 2015/0025818 A1 | 1/2015 | Das et al. |
| 2015/0071332 A1 | 3/2015 | Xu et al. |
| 2015/0094100 A1 | 4/2015 | Opshaug et al. |
| 2015/0222479 A1 | 8/2015 | Kim et al. |
| 2015/0287224 A1 | 10/2015 | Hooper et al. |
| 2015/0296335 A1 | 10/2015 | Joshi et al. |
| 2015/0326689 A1 | 11/2015 | Leppänen et al. |
| 2015/0366470 A1 | 12/2015 | Kim et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0265968 A1 | 9/2016 | Boutaud |
| 2016/0373997 A1 | 12/2016 | Petersen et al. |
| 2017/0026797 A1 | 1/2017 | Venkataraman et al. |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2017/0168163 A1 | 6/2017 | Small |
| 2017/0259920 A1 | 9/2017 | Lai et al. |
| 2017/0366223 A1 | 12/2017 | Stofer et al. |
| 2018/0011200 A1 | 1/2018 | Ramamurthy et al. |
| 2018/0013665 A1 | 1/2018 | Ko et al. |
| 2018/0026475 A1 | 1/2018 | Gelonese et al. |
| 2018/0083730 A1 | 3/2018 | Gulati et al. |
| 2018/0091211 A1 | 3/2018 | Hessler et al. |
| 2018/0098263 A1 | 4/2018 | Luo et al. |
| 2018/0146489 A1 | 5/2018 | Jin et al. |
| 2018/0156919 A1 | 6/2018 | Bieber et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0294165 A1 | 9/2019 | Hofmann et al. |
| 2019/0317207 A1 | 10/2019 | Schroder et al. |
| 2019/0332067 A1 | 10/2019 | Zhao et al. |
| 2019/0349172 A1 | 11/2019 | Zhang |
| 2020/0011968 A1 | 1/2020 | Hammes et al. |
| 2020/0018603 A1 | 1/2020 | Deng et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0391061 A1 | 12/2020 | Enejehlm et al. |
| 2020/0396708 A1 | 12/2020 | Bharadwaj et al. |
| 2021/0080967 A1 | 3/2021 | Pettinger et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0295492 A1 | 9/2022 | Shattil |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0179260 A1 | 6/2023 | Abdelghaffar et al. |
| 2023/0280435 A1 | 9/2023 | Schatz et al. |
| 2023/0280436 A1 | 9/2023 | Loren et al. |
| 2023/0280437 A1 | 9/2023 | Kwon et al. |
| 2023/0288518 A1 | 9/2023 | Graf et al. |
| 2023/0288519 A1 | 9/2023 | Schatz et al. |
| 2023/0288521 A1 | 9/2023 | Kwon et al. |
| 2023/0296716 A1 | 9/2023 | Dean et al. |
| 2023/0379007 A1 | 11/2023 | Kwon et al. |
| 2023/0379008 A1 | 11/2023 | Sorsby et al. |
| 2023/0393229 A1 | 12/2023 | Loren et al. |

(56) References Cited

U.S. PATENT DOCUMENTS

| | | | |
|---|---|---|---|
| 2023/0400549 | A1 | 12/2023 | Duan et al. |
| 2024/0151800 | A1 | 5/2024 | Stevens et al. |

FOREIGN PATENT DOCUMENTS

| | | | |
|---|---|---|---|
| CN | 101330448 | B | 12/2010 |
| CN | 101465793 | B | 2/2011 |
| CN | 202257277 | U | 5/2012 |
| CN | 101686179 | B | 1/2013 |
| CN | 103067286 | B | 6/2016 |
| CN | 107645417 | A | 1/2018 |
| CN | 110234147 | A | 9/2019 |
| CN | 115085799 | A | 9/2022 |
| CN | 115688598 | A | 2/2023 |
| DE | 102010010935 | A1 | 9/2011 |
| EP | 0908022 | A2 | 4/1999 |
| EP | 1912392 | A2 | 4/2008 |
| EP | 2208084 | A4 | 11/2011 |
| EP | 2743726 | A1 | 6/2014 |
| EP | 2466964 | B1 | 12/2017 |
| EP | 3026961 | B1 | 8/2020 |
| GB | 2441610 | B | 12/2011 |
| GB | 2542491 | A | 3/2017 |
| GB | 2568122 | B | 11/2019 |
| GB | 2598610 | A | 3/2022 |
| JP | 4290684 | B2 | 7/2009 |
| JP | 5164157 | B2 | 3/2013 |
| KR | 1020040107702 | A | 12/2004 |
| KR | 100568976 | B1 | 4/2006 |
| KR | 1020060078814 | A | 7/2006 |
| KR | 101231707 | B1 | 2/2013 |
| KR | 1020160071964 | A | 6/2016 |
| RU | 2718131 | C1 | 3/2020 |
| WO | 2008157609 | A3 | 3/2009 |
| WO | 2012062091 | A1 | 5/2012 |
| WO | 2012165938 | A1 | 12/2012 |
| WO | 2015114077 | A1 | 8/2015 |
| WO | 2015143604 | A1 | 10/2015 |
| WO | 2017101575 | A1 | 6/2017 |
| WO | 2018077864 | A1 | 5/2018 |
| WO | 2019045767 | A1 | 3/2019 |
| WO | 2020117421 | A1 | 6/2020 |
| WO | 2020165627 | A1 | 8/2020 |
| WO | 2020220233 | A1 | 11/2020 |
| WO | 2021251902 | A1 | 12/2021 |
| WO | 2022003386 | A1 | 1/2022 |
| WO | 2022202858 | A1 | 9/2022 |
| WO | 2022221429 | A1 | 10/2022 |
| WO | 2022232336 | A1 | 11/2022 |
| WO | 2022233042 | A1 | 11/2022 |
| WO | 2022233314 | A1 | 11/2022 |
| WO | 2023001520 | A1 | 1/2023 |
| WO | 2023030622 | A1 | 3/2023 |
| WO | 2023031904 | A1 | 3/2023 |
| WO | 2023047336 | A1 | 3/2023 |
| WO | 2023057655 | A1 | 4/2023 |
| WO | 2023067552 | A1 | 4/2023 |
| WO | 2023068990 | A1 | 4/2023 |
| WO | 2023081918 | A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D. et al: "Optimizing clustering algorithm in mobile ad hoc networks using simulated annealing", vol. 3, Mar. 16, 20023, pp. 1492-1497.
Extended European Search Report dated Apr. 4, 2024; European Application No. 21190368.7.

\* cited by examiner

```
                    ┌─────────────────────────────────────────┐
                    │ PROVIDING A TRANSMITTER NODE AND A      │
                    │ RECEIVER NODE, WHEREIN EACH NODE OF THE │
                    │ TRANSMITTER NODE AND THE RECEIVER NODE  │
                    │ ARE TIME SYNCHRONIZED, WHEREIN EACH     │
                    │ NODE OF THE TRANSMITTER NODE AND THE    │
                    │ RECEIVER NODE ARE IN MOTION, WHEREIN    │
                    │ EACH NODE OF THE TRANSMITTER NODE AND   │
          702 ──────│ THE RECEIVER NODE COMPRISES A           │
                    │ COMMUNICATIONS INTERFACE INCLUDING AT   │
                    │ LEAST ONE ANTENNA ELEMENT, WHEREIN EACH │
                    │ NODE OF THE TRANSMITTER NODE AND THE    │
                    │ RECEIVER NODE FURTHER COMPRISES A       │
                    │ CONTROLLER OPERATIVELY COUPLED TO THE   │
                    │ COMMUNICATIONS INTERFACE, THE CONTROLLER│
                    │ INCLUDING ONE OR MORE PROCESSORS,       │
                    │ WHEREIN THE CONTROLLER HAS INFORMATION  │
                    │ OF OWN NODE VELOCITY AND OWN NODE       │
                    │ ORIENTATION                             │
                    └─────────────────────────────────────────┘

┌─────────────────────────────────────────┐
                    │ BASED AT LEAST ON THE TIME              │
                    │ SYNCHRONIZATION, APPLYING, BY THE       │
          704 ──────│ TRANSMITTER NODE, DOPPLER CORRECTIONS   │
                    │ TO THE TRANSMITTER NODE'S OWN MOTIONS   │
                    │ RELATIVE TO A COMMON REFERENCE FRAME    │
                    └─────────────────────────────────────────┘

┌─────────────────────────────────────────┐
                    │ BASED AT LEAST ON THE TIME              │
                    │ SYNCHRONIZATION, APPLYING, BY THE       │
                    │ RECEIVER NODE, DOPPLER CORRECTIONS TO   │
                    │ THE RECEIVER NODE'S OWN MOTIONS         │
                    │ RELATIVE TO THE COMMON REFERENCE FRAME, │
          706 ──────│ WHEREIN THE COMMON REFERENCE FRAME IS   │
                    │ KNOWN TO THE TRANSMITTER NODE AND THE   │
                    │ RECEIVER NODE PRIOR TO THE TRANSMITTER  │
                    │ NODE TRANSMITTING SIGNALS TO THE        │
                    │ RECEIVER NODE AND PRIOR TO THE RECEIVER │
                    │ NODE RECEIVING THE SIGNALS FROM THE     │
                    │ TRANSMITTER NODE                        │
                    └─────────────────────────────────────────┘
```

FIG.7

SYSTEM AND METHOD FOR APPLICATION OF DOPPLER NULL SCANNING (DNS) TO POSITION NAVIGATION TIMING (PNT)

CROSS-REFERENCE TO RELATED APPLICATIONS

The present application is related to and claims priority from the following U.S. patent applications:

(a) U.S. patent application Ser. No. 17/233,107, filed Apr. 16, 2021, which is incorporated by reference in its entirety;
(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
(d) U.S. patent application Ser. No. 17/541,703, filed Dec. 3, 2021, which is incorporated by reference in its entirety, which claims priority to:
U.S. patent application Ser. No. 17/408,156, filed Aug. 20, 2021, which is incorporated by reference in its entirety; and
U.S. patent application Ser. No. 17/233,107, filed Apr. 16, 2021, all of which is incorporated by reference in its entirety;
(e) U.S. patent application Ser. No. 17/534,061, filed Nov. 23, 2021, which is incorporated by reference in its entirety;
(f) U.S. Patent Application No. 63/344,445, filed May 20, 2022, which is incorporated by reference in its entirety;
(g) U.S. patent application Ser. No. 17/857,920, filed Jul. 5, 2022, which is incorporated by reference in its entirety;
(h) U.S. Patent Application No. 63/400,138, filed Aug. 23, 2022, which is incorporated by reference in its entirety;
(i) U.S. patent application Ser. No. 17/940,898, filed Sep. 8, 2022, which is incorporated by reference in its entirety;
(j) U.S. patent application Ser. No. 17/941,907, filed Sep. 9, 2022, which is incorporated by reference in its entirety;
(k) U.S. patent application Ser. No. 17/957,881, filed Sep. 30, 2022, which is incorporated by reference in its entirety;
(l) U.S. patent application Ser. No. 17/990,491, filed Nov. 18, 2022, which is incorporated by reference in its entirety;
(m) U.S. patent application Ser. No. 18/130,285, filed Apr. 3, 2023, which is herein incorporated by reference in its entirety;
(n) U.S. patent application Ser. No. 18/134,950, filed Apr. 14, 2023, which is incorporated by reference in its entirety;
(o) U.S. patent application Ser. No. 18/196,807, filed May 12, 2023, which is incorporated by reference in its entirety;
(p) U.S. patent application Ser. No. 18/196,912, filed May 12, 2023, which is incorporated by reference in its entirety;
(q) U.S. patent application Ser. No. 18/196,931, filed May 12, 2023, which is incorporated by reference in its entirety;
(r) U.S. patent application Ser. No. 18/196,765, filed May 12, 2023, which is incorporated by reference in its entirety;
(s) U.S. patent application Ser. No. 18/196,944, filed May 12, 2023, which is incorporated by reference in its entirety;
(t) U.S. patent application Ser. No. 18/196,786, filed May 12, 2023, which is incorporated by reference in its entirety;
(u) U.S. patent application Ser. No. 18/196,936, filed May 12, 2023, which is incorporated by reference in its entirety;
(v) U.S. patent application Ser. No. 18/198,025, filed May 16, 2023, which is incorporated by reference in its entirety;
(w) U.S. patent application Ser. No. 18/198,152, filed May 16, 2023, which is incorporated by reference in its entirety;
(x) U.S. patent application Ser. No. 18/198,671, filed May 17, 2023, which is incorporated by reference in its entirety;
(y) U.S. patent application Ser. No. 18/199,808, filed May 19, 2023, which is incorporated by reference in its entirety;
(z) U.S. patent application Ser. No. 18/199,562, filed May 19, 2023, which is incorporated by reference in its entirety;
(aa) U.S. patent application Ser. No. 18/199,760, filed May 19, 2023, which is incorporated by reference in its entirety; and
(bb) U.S. patent application Ser. No. 18/199,779, filed May 19, 2023, which is incorporated by reference in its entirety.

BACKGROUND

Position, Navigation, and Timing (PNT) is the combination of three distinct, constituent capabilities: Positioning, the ability to accurately and precisely determine one's location and orientation two-dimensionally (or three-dimensionally when required) referenced to a standard geodetic system (such as World Geodetic System 1984, or WGS84); Navigation, the ability to determine current and desired position (relative or absolute) and apply corrections to course, orientation, and speed to attain a desired position anywhere around the world; and Timing, the ability to acquire and maintain accurate and precise time from a standard (Coordinated Universal Time, or UTC), anywhere in the world and within user-defined timeliness parameters.

Historically, PNT relied upon positioning from sensors such as compasses, maps, clocks, and sextants; navigation from maps and positioning information; and timing from the sun, moon, stars, and clocks. With the advent of modern electronics, PNT sensors now include Global Positioning Systems (GPS) and other Global Navigation Satellite Systems (GNSS), IMUs, barometers, and other electronic sensors.

Each of these different sensors have different inherent accuracies and susceptibility to different intentional and non-intentional error inducing events.

There are both intentional and non-intentional effects and threats to GPS and GNSS systems that can cause errors or loss of GPS and GNSS PNT information. Extreme solar flares can damage satellites causing gaps in GPS and GNSS coverages. GPS and GNSS interference can come from multipole sources, including radio emissions in nearby bands, intentional or unintentional jamming, and naturally occurring space weather. Adversarial spoofers, can send signals that make a receiver think it is erroneous location.

Both commercial and military users need PNT protection against these effects and threats. The integration of multiple sensors can provide high availability and high integrity PNT, also known as Assured-PNT (A-PNT). Availability is the ability to access accurate PNT information and integrity is the ability to trust the PNT information. Generation and distribution of A-PNT is a near-term capability requirement addressing both integrity and availability gaps created by these effects and threats.

SUMMARY

A system may include a receiver node. The receiver node may include a communications interface including at least one antenna element and a controller operatively coupled to the communications interface. The controller may include one or more processors. The receiver node is time synchronized with a transmitter node to apply Doppler corrections to the receiver node's own motions relative to a common reference frame. The common reference frame is known to the receiver node and the transmitter node prior to the transmitter node transmitting signals to the receiver node and prior to the receiver node receiving the signals from the transmitter node. The receiver node may be configured to: based at least on the receiver node being time synchronized with the transmitter node to apply Doppler corrections and the common reference frame, use Doppler null scanning (DNS) to determine DNS derived information, the DNS derived information including a bearing and the receiver node's relative position relative to the transmitter node; and output a position, navigation, and timing (PNT) solution based at least on the DNS derived information.

In a further aspect, a method may include providing a receiver node, comprising: a communications interface including at least one antenna element; and a controller operatively coupled to the communications interface, the controller including one or more processors, wherein the receiver node is time synchronized with a transmitter node to apply Doppler corrections to the receiver node's own motions relative to a common reference frame, wherein the common reference frame is known to the receiver node and the transmitter node prior to the transmitter node transmitting signals to the receiver node and prior to the receiver node receiving the signals from the transmitter node. The method may further include based at least on the receiver node being time synchronized with the transmitter node to apply Doppler corrections and the common reference frame, using, by the receiver node, Doppler null scanning (DNS) to determine DNS derived information, the DNS derived information including a bearing and the receiver node's relative position relative to the transmitter node. The method may further include outputting, by the receiver node, a position, navigation, and timing (PNT) solution based at least on the DNS derived information.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7 is a flow diagram illustrating a method according to example embodiments of this disclosure;

DETAILED DESCRIPTION

Figure 1:
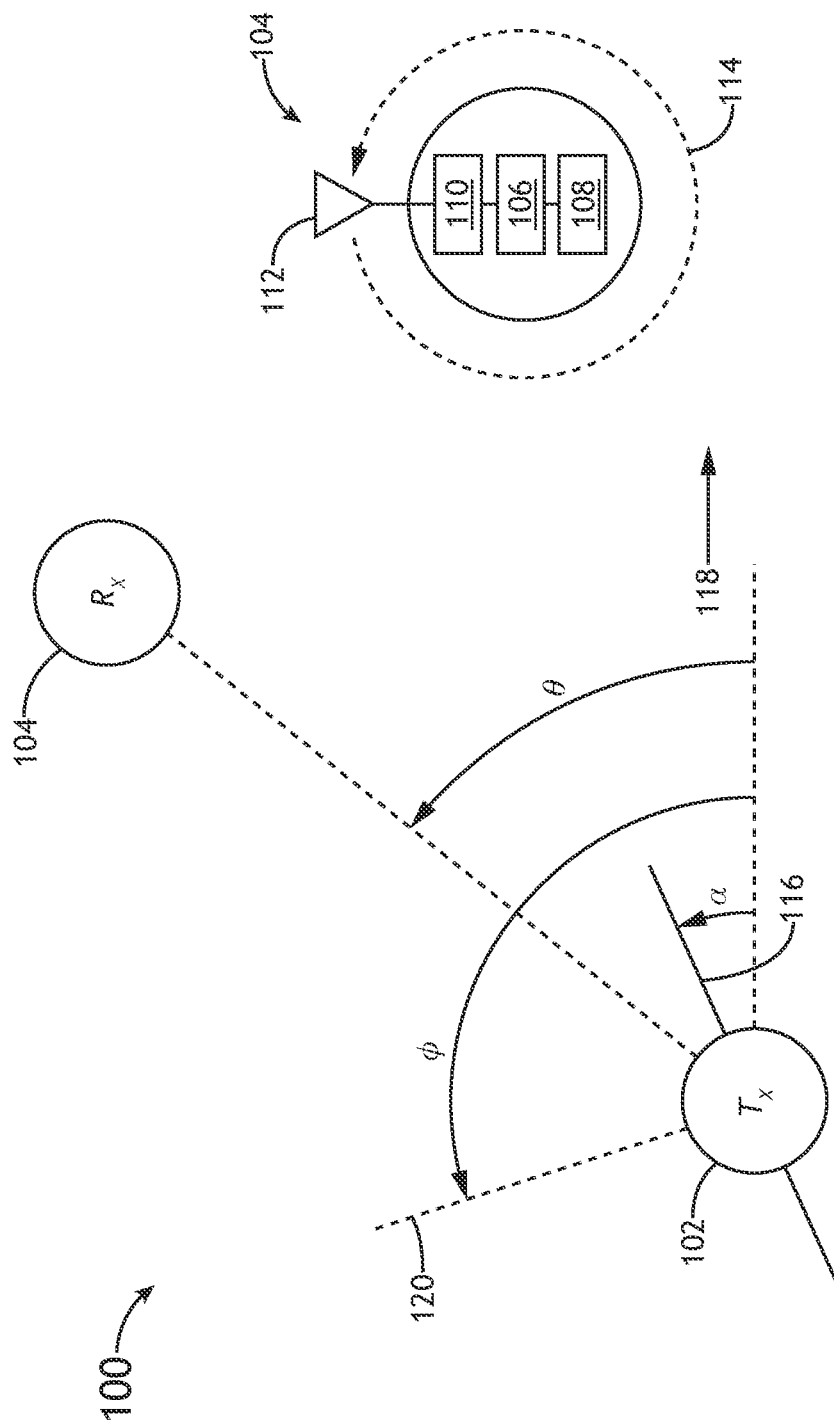
FIG. 1 is a diagrammatic illustration of a mobile ad hoc network (MANET) and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a method and a system for application of DNS to PNT, such as exemplarily shown and described with reference to FIGS. 8-10.

In some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network, itself.

Referring to FIG. 1, a system (e.g., a multi-node communications network 100 or non-network system) is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile ad-hoc network (MANET) in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104.

In embodiments, the Tx node 102 and Rx node 104 may both be moving in an arbitrary direction at an arbitrary speed, and may similarly be moving relative to each other. For example, the Tx node 102 may be moving relative to the Rx node 104 according to a velocity vector 116, at a relative velocity $V_{TX}$ and a relative angular direction (an angle α relative to an arbitrary direction 118 (e.g., due east); θ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle ϕ relative to the arbitrary direction 118). The transmitting waveform (e.g., the communications interface 110 of the Tx node 102) may be informed by the platform (e.g., the controller 106) of its velocity vector and orientation (e.g., a, $V_T$) and may adjust its transmitting frequency to remove the Doppler frequency shift at each Doppler nulling direction 120 and angle ϕ.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned θ from east relative to the transmitter, the transmitter node 102 is moving with a speed $|\vec{V}_T|$ and direction a from east and a snapshot of the scanning ϕ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V}_T|}{c} \cos(\theta - \alpha),$$

where c is the speed of light

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V}_T|$) and velocity direction (α). That transmitter frequency adjustment ($\Delta f_T$) is proportional to the velocity projection onto the 'Null' direction (ϕ) and is:

$$\frac{\Delta f_T}{f} = -\frac{|\vec{V}_T|}{c} \cos(\varphi - \alpha)$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)]$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Figure 2A:
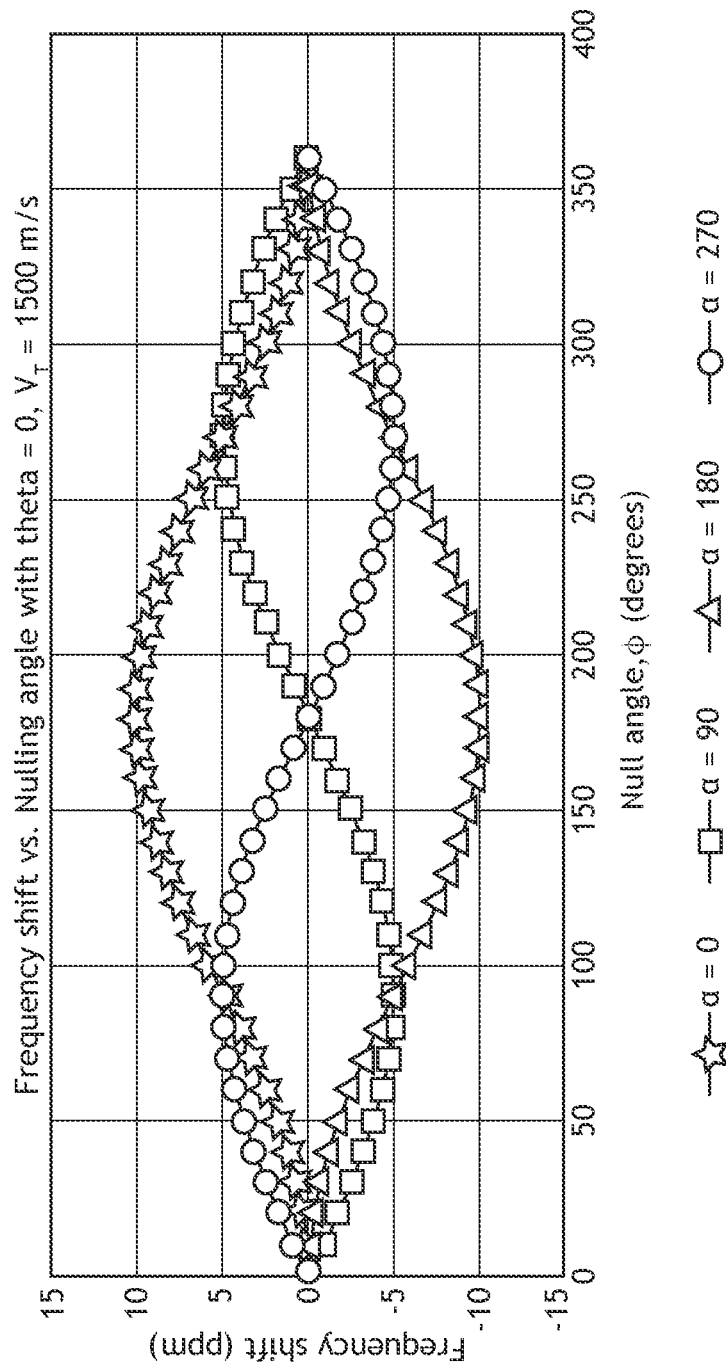
FIG. 2A is a graphical representation of frequency shift profiles within the MANET of FIG. 1.
Figure 2B:
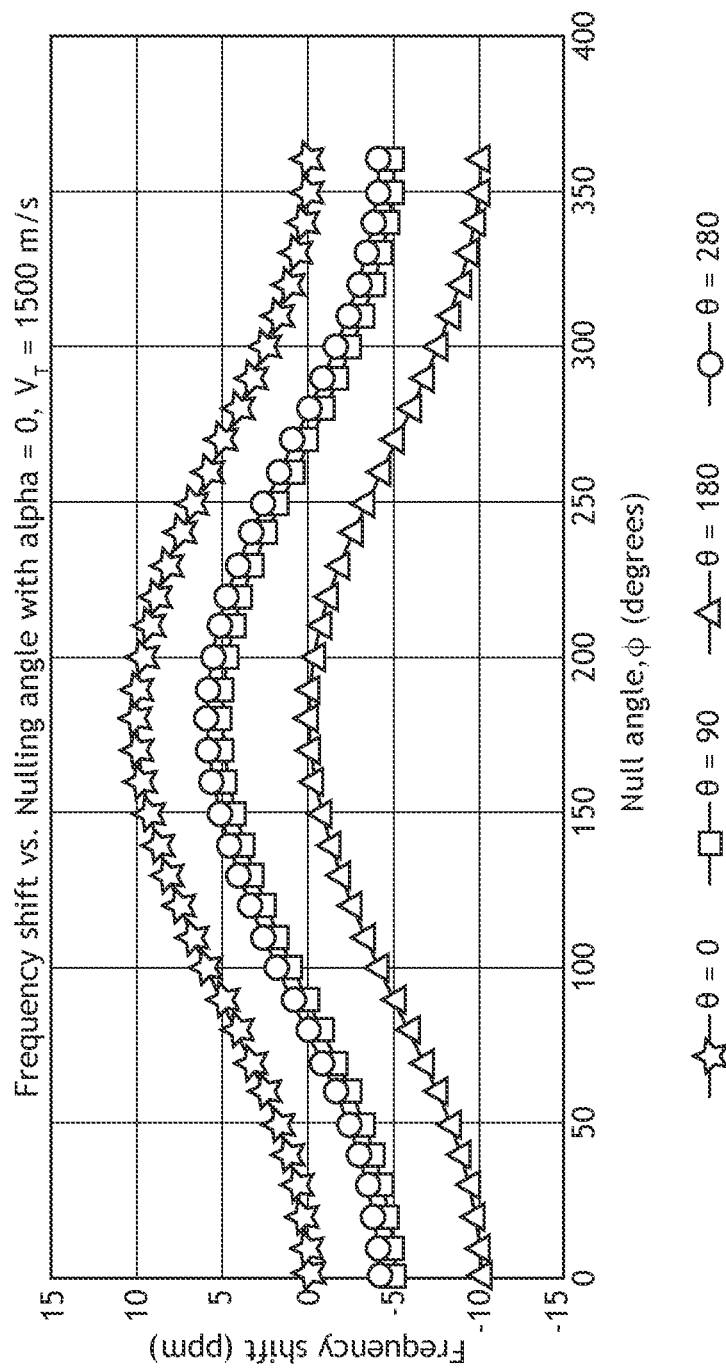
FIG. 2B is a graphical representation of frequency shift profiles within the MANET of FIG. 1.

FIG. 2A shows the resulting net frequency shift as a function of the 'Null' direction for scenarios where a stationary receiver is East of the transmitter (theta=0), and with a transmitter speed of 1500 meters per second (m/s). FIG. 2B shows the results for a stationary receiver and for several directions with an Eastern transmitter node velocity direction (alpha=0). The frequency shifts are in units of parts per million (ppm). As shown in FIGS. 2A and 2B, the amplitude is consistent with the transmitter node's 102 speed of 5 ppm $[|\vec{V_T}|/c*(1\times10^6)]$ regardless of the velocity direction or position, the net frequency shift is zero when the 'Null' angle is in the receiver direction (when $\phi=\theta$), and the minimum occurs when the 'Null' is aligned with the transmitter node's 102 velocity direction (when $\phi=\alpha$).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIG. 2A, and ±90 degrees in FIG. 2B) so there is initially an instance of ambiguity in position direction. In this case the receiver node 104 knows the transmitter node 102 is either East or West of the receiver node 104.

Figure 3:
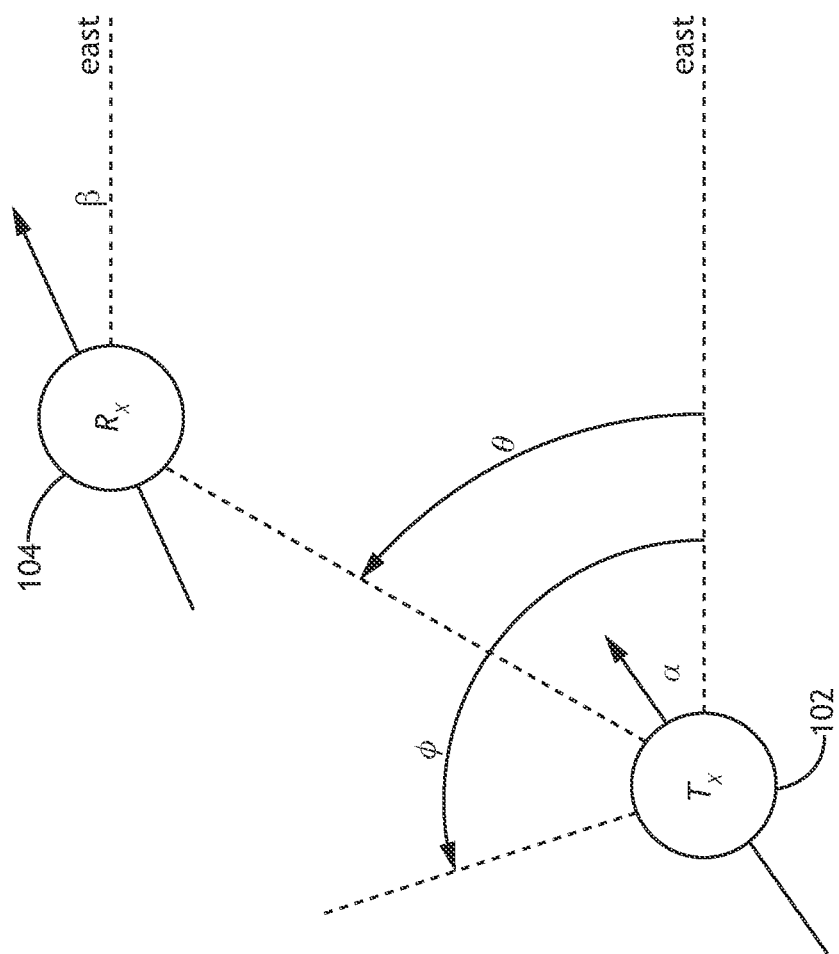
FIG. 3 is a diagrammatic illustration of a transmitter node and a receiver node according to example embodiments of this disclosure.

Referring to FIG. 3, a multi-node communications network 100 is disclosed. The multi-node communications network 100 may include multiple communications nodes, e.g., a transmitter (Tx) node 102 and a receiver (Rx) node 104. As shown in FIG. 3 both of the transmitter node 102 and the receiver node 104 are in motion in two dimensions.

The simultaneous movement scenario is depicted in FIG. 3 where the receiver node 104 is also moving in a generic velocity characterized by a speed $|\vec{V_R}|$ and the direction, $\beta$. The protocol for the moving receiver node 104 incorporates a frequency adjustment on the receiver node's 104 side to compensate for the receiver node's 104 motion as well. The equations have two additional terms. One is a Doppler term for the motion of the receiver and the second is frequency compensation by the receiver.

Again, the Doppler shift is a physical phenomenon due to motion and can be considered as a channel effect, but in this case both the transmitter node 102 and the receiver node 104 are moving so there are two Doppler shift terms. The true Doppler shift as seen by the receiver due to the relative radial velocity is:

$$\frac{\Delta f_{DOPPLER}}{f} = \frac{|\vec{V_T}|}{c}\cos(\theta - \alpha) - \frac{|\vec{V_R}|}{c}\cos(\theta - \beta)$$

The other factors are the transmitter node 102 and receiver node 104 frequency adjustment terms that exactly compensates the Doppler shift when the 'Null' direction aligns with the receiver direction. It is the job of the transmitter node 102 to adjust the transmitter node's 102 transmit frequency according to its own speed ($|\vec{V_T}|$), and velocity direction ($\alpha$). That transmitter node frequency adjustment is proportional to the velocity projection onto the 'Null' direction ($\phi$) and is the first term in the equation below.

It is the job of the receiver node 104 to adjust the receiver node frequency according to the receiver node's 104 own speed ($|\vec{V_R}|$), and velocity direction ($\beta$). That receiver node frequency adjustment is proportional to the velocity projection onto the 'Null' direction ($\phi$) and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V_T}|}{c}\cos(\varphi - \alpha) + \frac{|\vec{V_R}|}{c}\cos(\varphi - \beta)$$

The net frequency shift seen by the receiver is the sum of all terms:

$$\frac{\Delta f_{net}}{f} = \frac{|\vec{V_T}|}{c}[\cos(\theta - \alpha) - \cos(\varphi - \alpha)] - \frac{|\vec{V_R}|}{c}[\cos(\theta - \beta) - \cos(\varphi - \beta)]$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) $\alpha$, $|\vec{V_T}|$, and $\theta$ are constants.

Figure 4A:
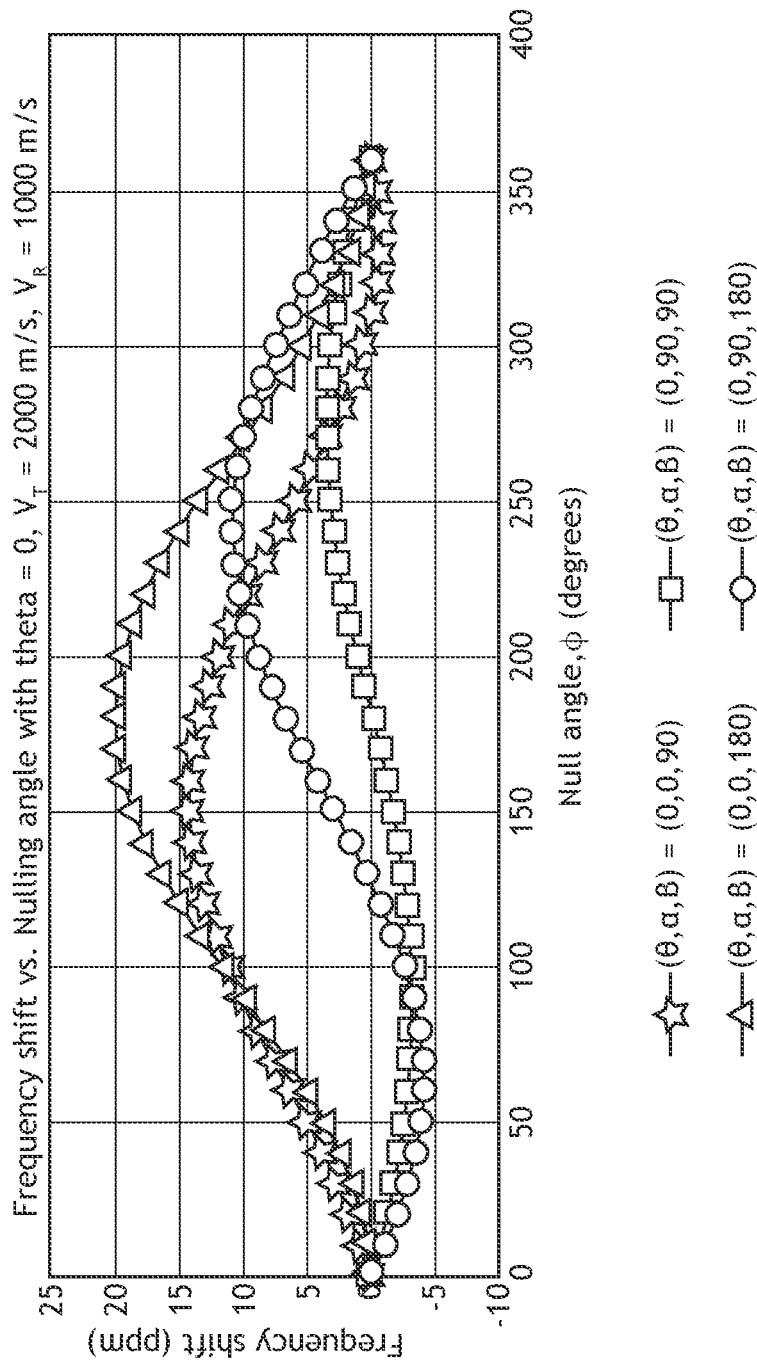
FIG. 4A is a graphical representation of frequency shift profiles within the MANET of FIG. 3.
Figure 4B:
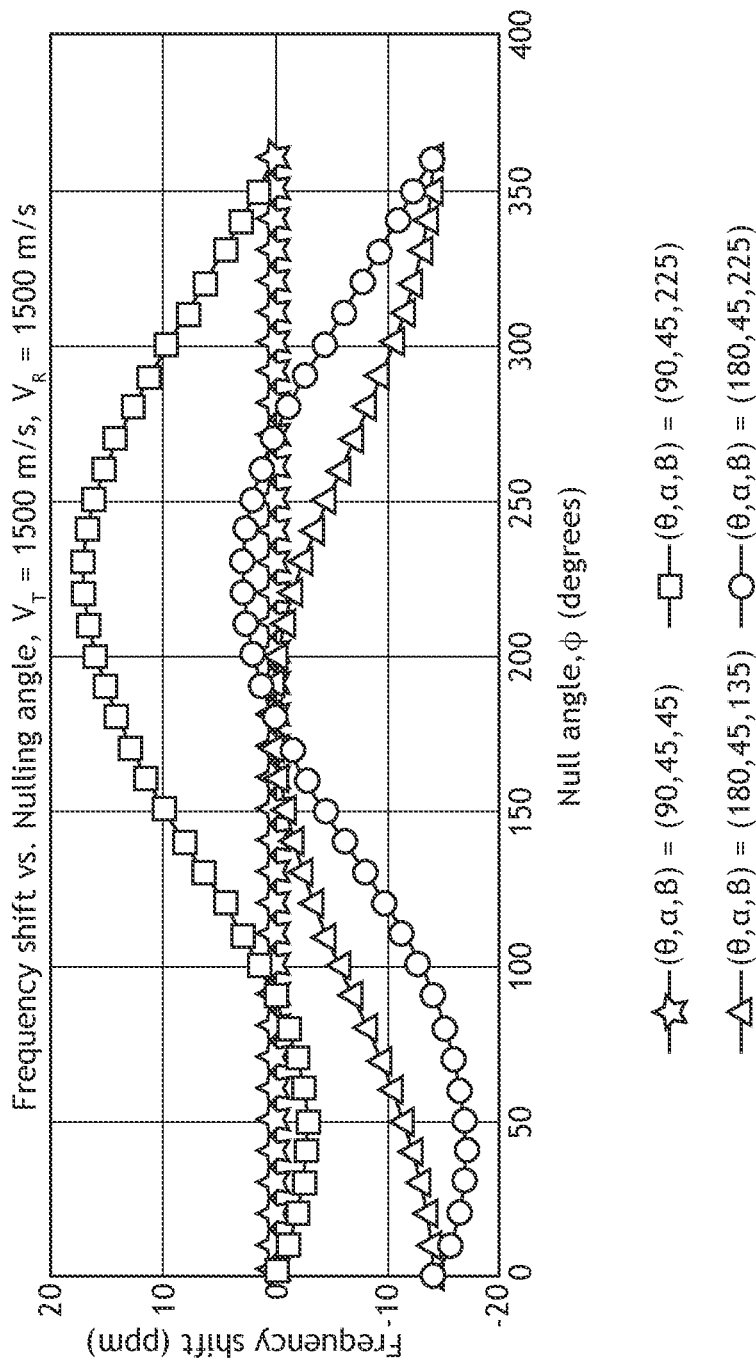
FIG. 4B is a graphical representation of frequency shift profiles within the MANET of FIG. 3.

The net frequency shift for the two-dimensional (2D) moving receiver node 104 approach is shown in FIGS. 4A and 4B for several scenario cases of receiver node location, $\theta$, and transmitter node and receiver node speeds ($|\vec{V_T}|$ & $|\vec{V_R}|$), as well as transmitter node and receiver node velocity direction ($\alpha$ and $\beta$). FIG. 4A has different speeds for the transmitter node 102 and receiver node 104 as well as the receiver node location of $\theta=0$. FIG. 4B has the same speed for the transmitter node and receiver node. Similarly, there are three concepts to notice here:

The amplitude is consistent with the relative velocity between transmitter node 102 and receiver node 104 $[|(|\vec{V_T}|\cos(\alpha)-|\vec{V_R}|\cos(\beta))|/c*(1e6)]$.

The net frequency shift is zero when the 'Null' angle is in the receiver direction (when $\phi=\theta$).

The minimum occurs when the 'Null' is aligned with the relative velocity direction (when $\phi=\text{angle}(|\vec{V_T}|\cos(\alpha)-|\vec{V_R}|\cos(\beta)))$.

Again, there is an initial dual point ambiguity with the position, $\theta$, but the transmitter node's 102 speed and velocity vector is known.

Figure 5:
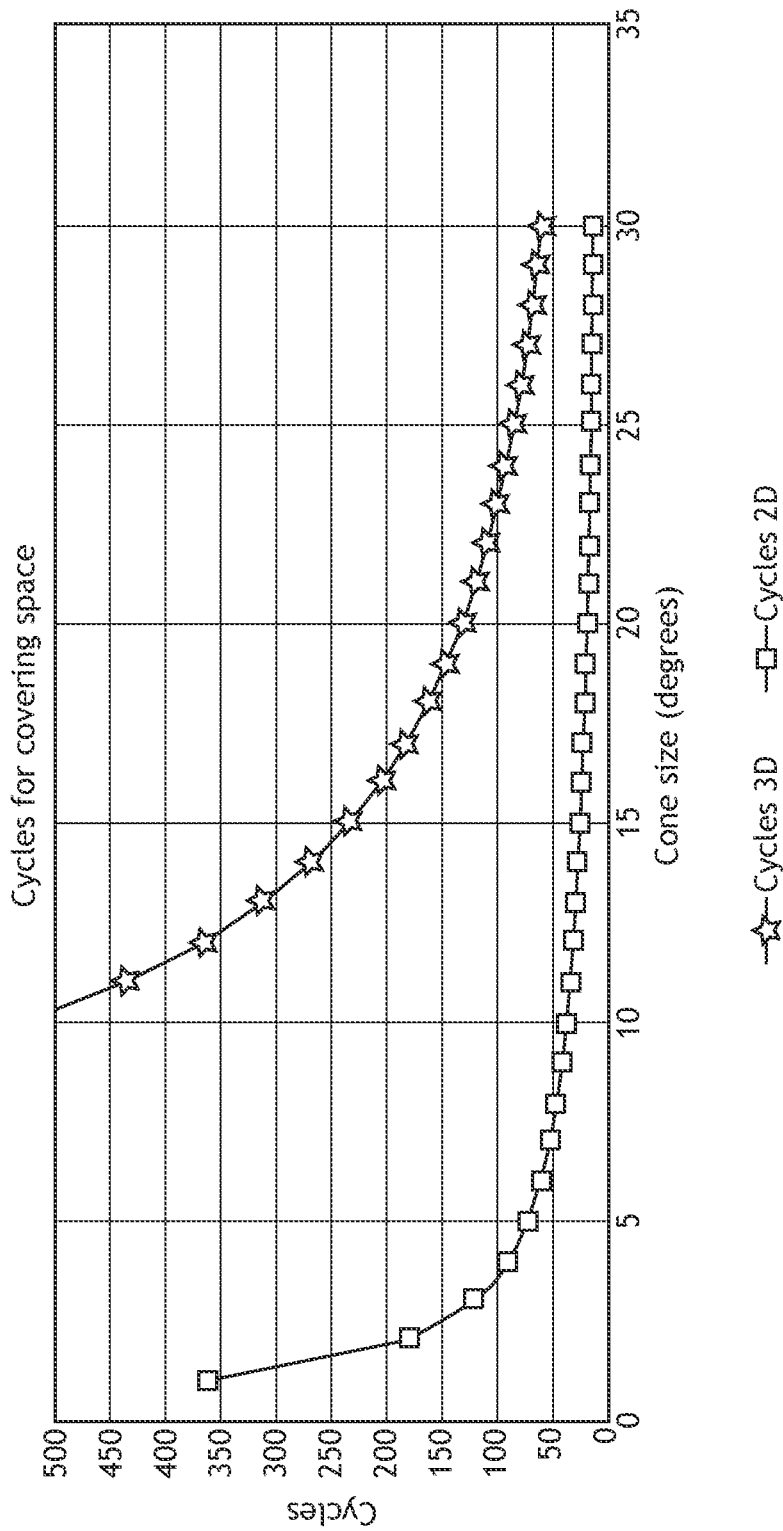
FIG. 5 is an exemplary graph of sets for covering space.

Referring now to FIG. 5, while the 2D picture is easier to visualize, the same principles apply to the 3D case. FIG. 5 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full 4 pi steradians. The fraction is equal to the integral $$FractionCoverage3D = \frac{\int_0^{ConeSize/2} r^2 \sin(\theta') d\theta' d\varphi}{4\pi r^2} = \frac{1 - \cos(ConeSize/2)}{2}$$

$$FractionCoverage2D = 2\pi/ConeSize$$

The number of sets to span the space is shown in FIG. 5 for both the 2D and 3D cases which correlates with discovery time. Except for narrow cone sizes, the number of sets is not drastically greater for the 3D case (e.g., approximately 15 times at 10 degrees, 7.3 time at 20 degrees, and around 4.9 times at 30 degrees). Unless systems are limited to very narrow cone sizes, the discovery time for 3D searches is not overwhelming compared to a 2D search.

Figure 6:
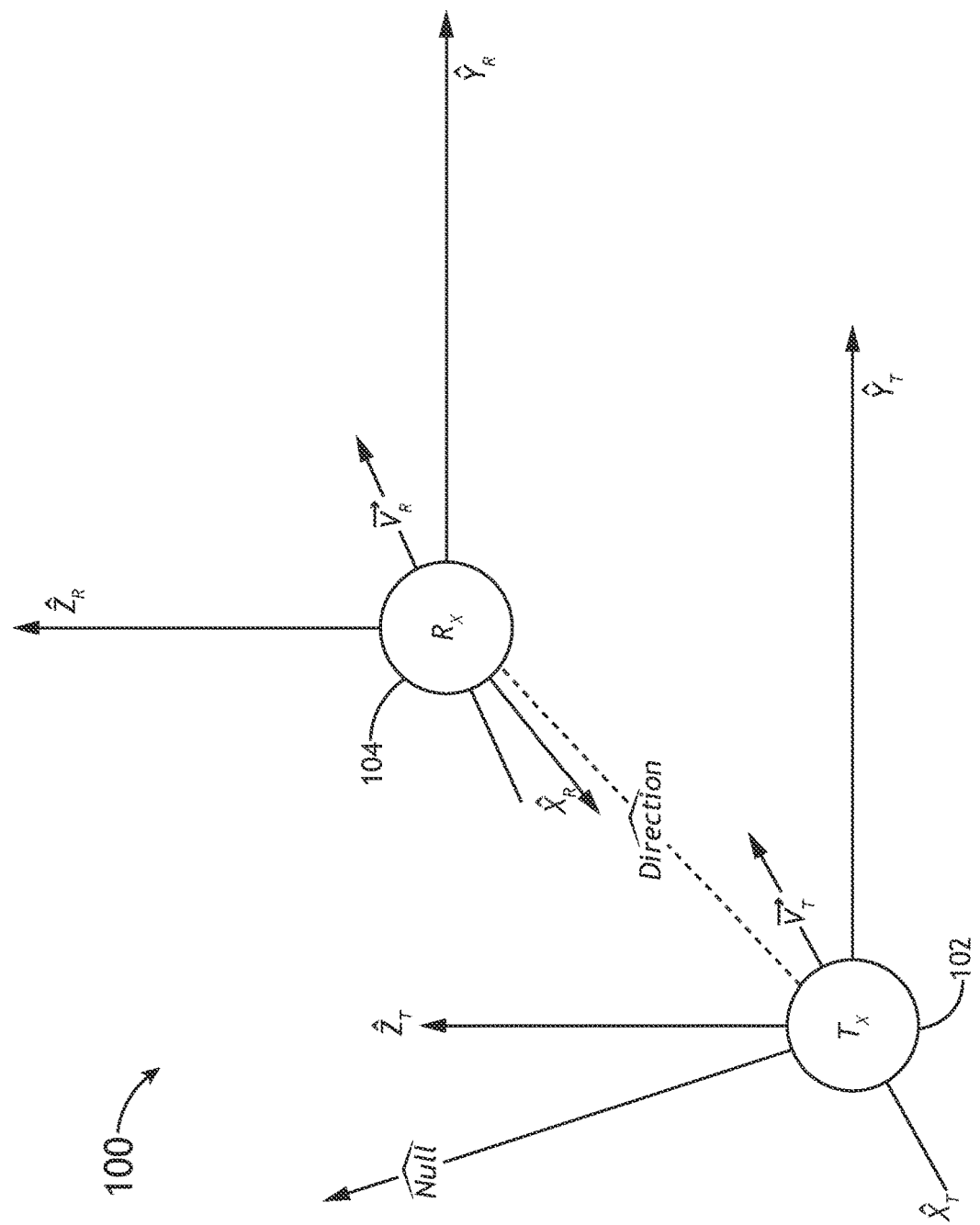
FIG. 6 is a diagrammatic illustration of a transmitter node and a receiver node according to example embodiments of this disclosure.

Referring now to FIG. 6, a multi-node communications network 100 is disclosed. The multi-node communications network 100 may include multiple communications nodes, e.g., a transmitter (Tx) node 102 and a receiver (Rx) node 104. As shown in FIG. 6 both of the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 6 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T} \cdot \widehat{Direction} - \frac{1}{c}\vec{V_R} \cdot \widehat{Direction}$$

The nulling protocol adjusts the transmit node frequency and receiver node frequency due to their velocity projections onto the $\widehat{Null}$ direction $$\frac{\Delta f_T}{f} = -\frac{1}{c}\vec{V_T} \cdot \widehat{Null} + \frac{1}{c}\vec{V_R} \cdot \widehat{Null}$$

The net frequency shift seen by the receiver node 104 is the sum of all terms:

$$\frac{\Delta f_{net}}{f} = \frac{1}{c}\vec{V_T} \cdot \widehat{Direction} - \frac{1}{c}\vec{V_R} \cdot \widehat{Direction} - \frac{1}{c}\vec{V_T} \cdot \widehat{Null} + \frac{1}{c}\vec{V_R} \cdot \widehat{Null}$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude, $$Amplitude = \frac{1}{c}\left|\vec{V_R} - \vec{V_T}\right|$$

Lastly, the net frequency is zero when the $\widehat{Null}$ is parallel (i.e., parallel in same direction, as opposed to anti-parallel) to $\widehat{Direction}$.

$$\frac{\Delta f_{net}}{f} = 0 \text{ when, } \frac{1}{c}\vec{V_T} \cdot \widehat{Direction} - \frac{1}{c}\vec{V_R} \cdot \widehat{Direction} =$$

$$\frac{1}{c}\vec{V_T} \cdot \widehat{Null} - \frac{1}{c}\vec{V_R} \cdot \widehat{Null} \text{ or, } (\vec{V_T} - \vec{V_R}) \cdot \widehat{Direction} = (\vec{V_T} - \vec{V_R}) \cdot \widehat{Null}$$

For the 3D case:
The amplitude is consistent with the relative velocity between transmitter node 102 and receiver node 104 [|$\vec{V_R}-\vec{V_T}$|/c].

The net frequency shift is zero when the 'Null' angle is in the receiver node direction, $(\vec{V_T}-\vec{V_R}) \widehat{Direction}=(\vec{V_T}-\vec{V_R}) \cdot \widehat{Null}$).

The minimum occurs when the 'Null' is aligned with the relative velocity direction.

Referring still to FIG. 6, in some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile ad-hoc network (MANET) comprising the transmitter node 102 and the receiver node 104.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 102 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 704 may include based at least on the time synchronization, applying, by the transmitter node, Doppler corrections to the transmitter node's own motions relative to a common reference frame.

A step 706 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 700 may include any of the operations disclosed throughout.

Application of Doppler Null Scanning (DNS) to Position Navigation Timing (PNT)

Figure 8:
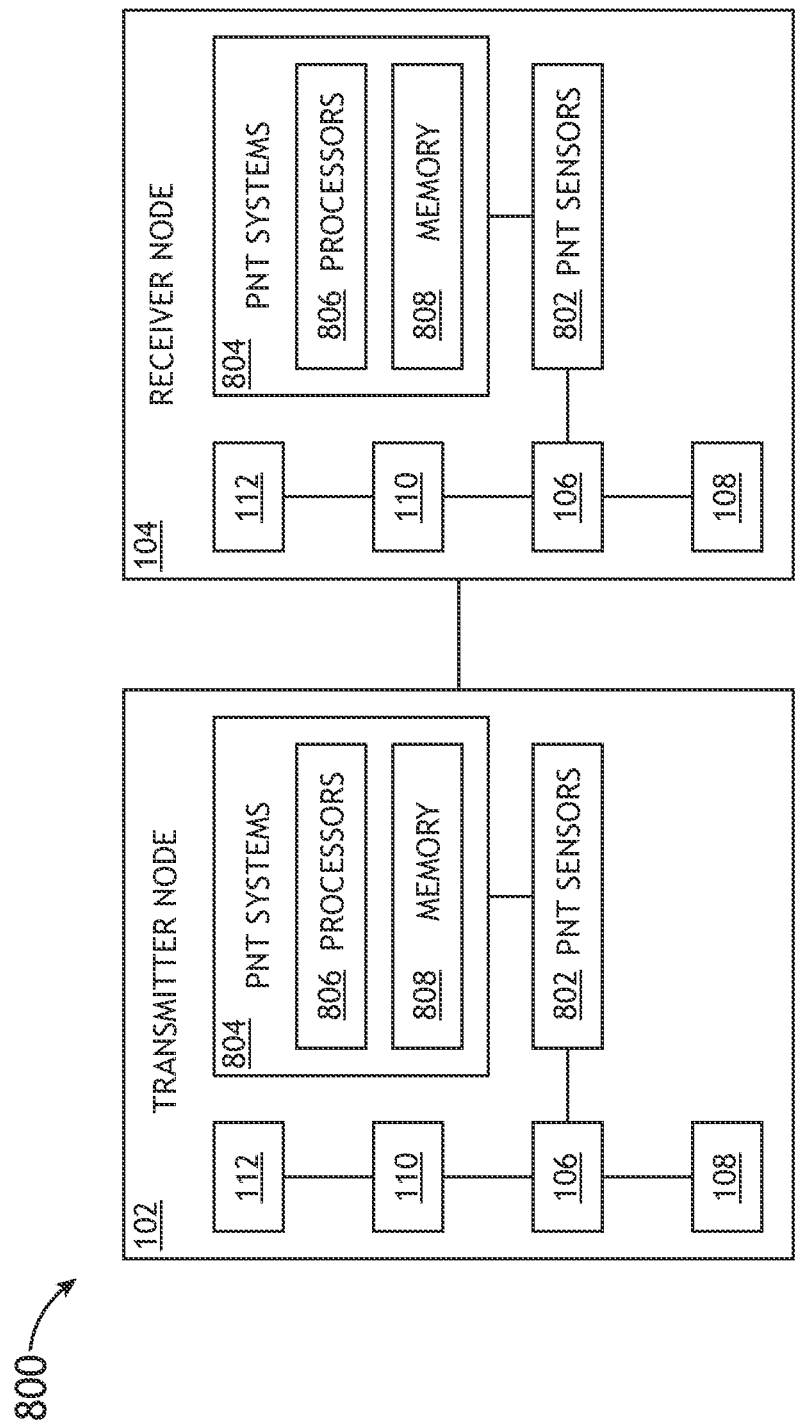
FIG. 8 is a diagrammatic illustration of a system thereof according to example embodiments of this disclosure.
Figure 9:
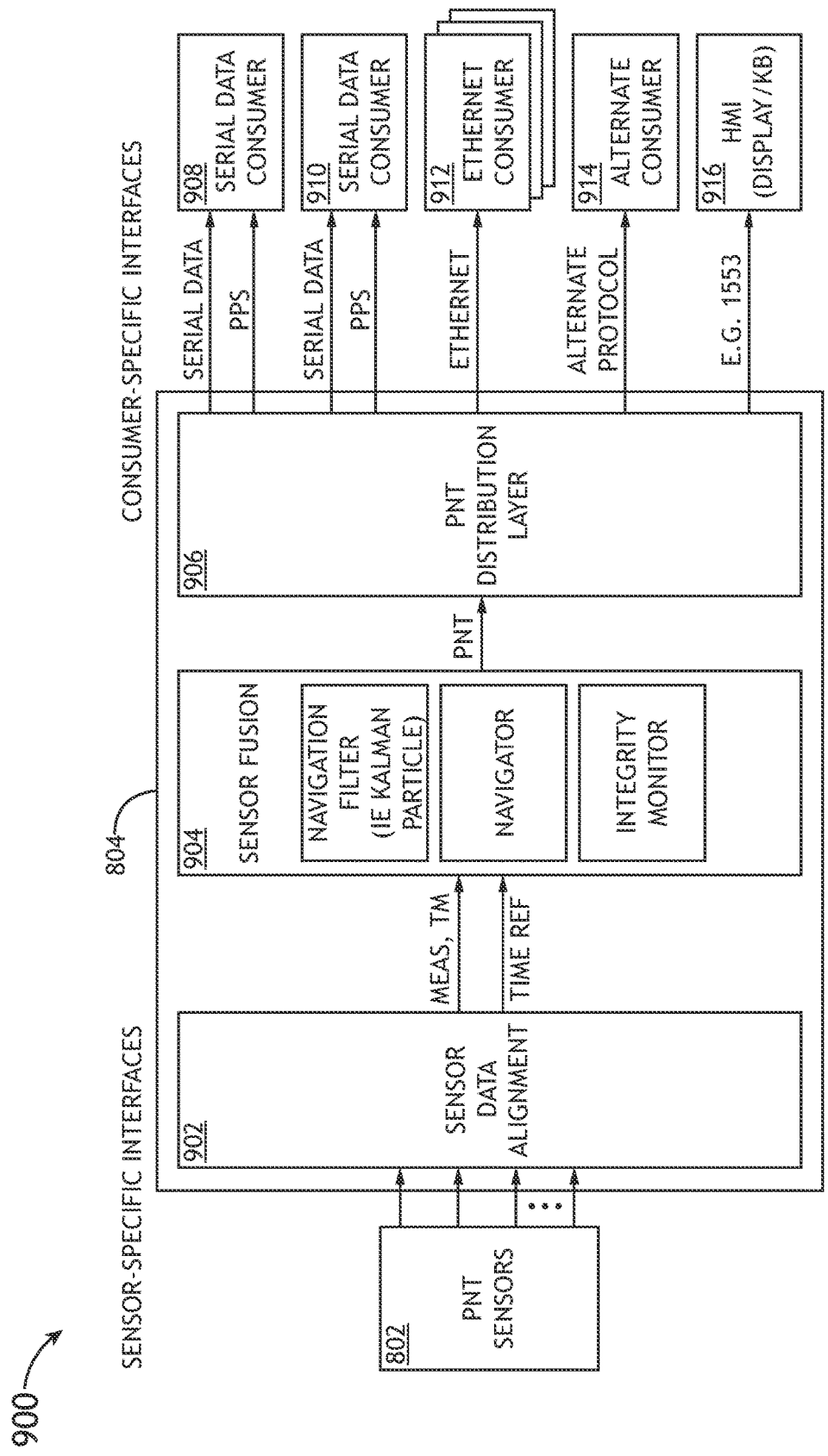
FIG. 9 is a diagrammatic illustration of the PNT system of FIG. 8 thereof according to example embodiments of this disclosure.
Figure 10:
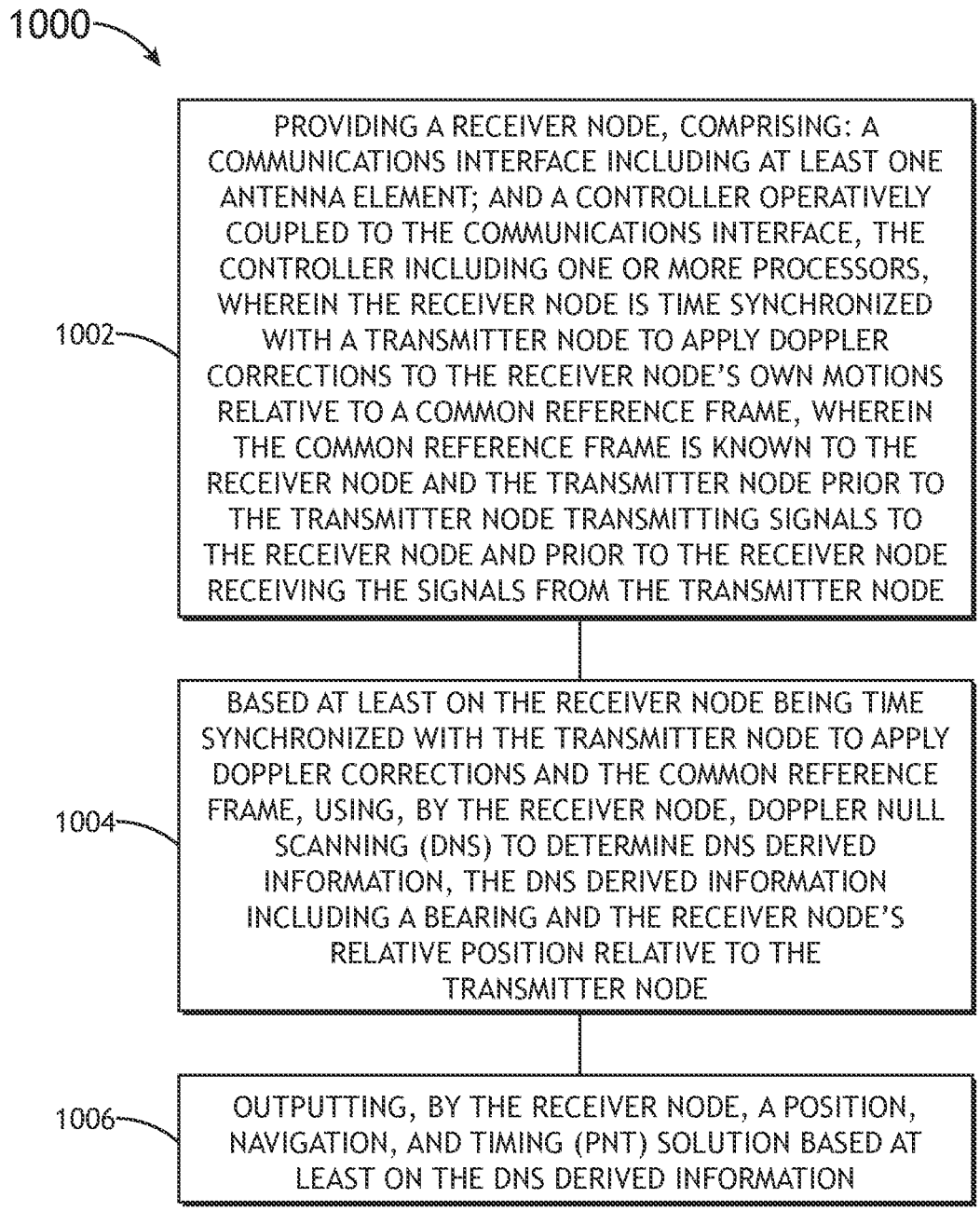
FIG. 10 is a flow diagram illustrating a method according to example embodiments of this disclosure.

Referring generally now to FIGS. 8-10, some embodiments may use DNS as at least one sensor input (e.g., at least one of multiple sensor inputs) for PNT (e.g., APNT). Some embodiments may include two or more nodes (e.g., 102, 104), wherein one or more of such nodes are moving. Some embodiments may include a system (e.g., 100 or 800) having any suitable number of nodes. Some embodiments are not limited to networking or communications (such as exemplarily described with respect to FIG. 1), although APNT can be used with networking and communications to provide location which can help with network topologies. Also, some APNT sensors may use mesh networks to exchange information from different nodes to determine an overall system PNT solution that is more accurate than the individual PNT solutions.

In some embodiments, DNS may provide relative bearing and relative position between nodes within a known coordinate system, while in general, PNT and/or APNT provide absolute bearing and position within a known coordinate system. In some embodiments, PNT and/or APNT can use DNS to obtain bearings to known locations to provide absolute bearing and position. These known locations may be fixed sites with known locations, or mobile nodes with good PNT (e.g., GPS) that mobile nodes with poorer PNT (e.g., GPS with larger error ranges) can take relative bearing from.

In some embodiments, the same concepts for fusing multiple PNT sensor sources together to provide APNT may be adapted by systems of multiple nodes to provide an equivalent type of relative PNT where multiple relative position and timing sources, which may include DNS, are combined together to provide a more assured relative PNT. This may be useful for application of mobile nodes in the face of interference or jamming. APNT systems may work by knowing the error and error sensitivity of the multiple different sensor inputs so as to know how to weight and trust the different inputs.

In some embodiments, PNT and APNT systems can combine multiple sensor inputs together. PNT and A-PNT systems may fuse such multiple sensors together to come up with a joint combined position, timing, and navigation information. Each of these sensor inputs may have errors and uncertainty in their solutions, so that the PNT and A-PNT systems consider the accuracy of the information for each sensor when fusing together. In general, A-PNT systems include more sophisticated tracking and sensor fusing processes that may include detecting not only errors but intentional spoofing of signals, such as GPS spoofing.

Some embodiments combine DNS sensor inputs with other sensor inputs for the multisensory fusion to determine a PNT and/or APNT solution.

In some embodiments, because DNS is based upon physical doppler properties, it can be used to aid in detecting spoofing, such as when a mesh network node reports a position and velocity vector that is at variance with the DNS measurement; this application is related to U.S. patent application Ser. No. 18/199,779, filed May 19, 2023, which is incorporated by reference in its entirety.

Referring now to FIG. 8, an exemplary embodiment of a system (e.g., a multi-node communications network 100 or non-network system) of FIG. 1 is disclosed. The system of FIGS. 8-9 may be implemented similarly and function similarly as the system of FIG. 1, except that, for example, each of the transmitter nodes 102 and receiver nodes 104 may optionally further include at least one position, navigation, and timing (PNT) system 804 and at least one PNT sensor 802, some or all of which may be communicatively coupled to any of the other elements of nodes 102, 104 at any given time. Additionally, the system of FIG. 8 is not limited to the example of networking or communications (such as exemplarily described with respect to FIGS. 1-7).

For example, suitable PNT sensors 802 may include, but not be limited to, any or all of the following sensors: DNS; GPS; Inertial Measurement Unit (IMU); barometers; compasses (e.g., magnetometers); maps of terrain, buildings, sensor locations, etc.; cameras and/or other optical and/or radiofrequency (RF) sensors to determine the shape of terrain, buildings, etc.; RF beacons—such as those used in air traffic control (ATC) like TACAN, DME, as well as other RF sources from known locations, such as TV transmitters, AM/FM radio transmitters, cell site towers, etc.; radio networks that exchange two way timing and ranging (TWTR) signals, including mesh networks on nodes on the move; directional RF signals that sweep signals in space for pointing and direction locations, such as TACAN; and/or inertial navigation system (INS) that include things like accelerometers, rotation sensors (such as counting wheel/tire rotations), gyroscopes, etc., such as for dead reckoning tracking of position and velocity.

In some embodiments, the PNT system 804 may include at least one processor 806 and at least one memory 808, which may be communicatively coupled at any given time. For example, the at least one processor 806 may be configured to: based at least on the receiver node being time synchronized with the transmitter node to apply Doppler corrections and the common reference frame, use Doppler null scanning (DNS) to determine DNS derived information, the DNS derived information including a bearing and the receiver node's relative position relative to the transmitter node; output a position, navigation, and timing (PNT) solution based at least on the DNS derived information; output a position, navigation, and timing (PNT) solution based at least on the DNS derived information; time align at least the DNS derived information with sensor data as time aligned information; and/or perform sensor fusion on the time aligned information to determine the PNT solution as a fused PNT solution for the receiver node 104.

In some embodiments, a system 800 may include a receiver node 104 and a transmitter node 102. For example, the receiver node 104 may include a communications interface 110 including at least one antenna element 112 and a controller 106 operatively coupled to the communications interface 110. The controller 106 may include one or more processors. The receiver node 104 is time synchronized with a transmitter node 102 to apply Doppler corrections to the receiver node's 104 own motions relative to a common reference frame. The common reference frame is known to the receiver node 104 and the transmitter node 102 prior to the transmitter node 102 transmitting signals to the receiver node 104 and prior to the receiver node 104 receiving the signals from the transmitter node 102. The receiver node 104 may be configured to (such as by use of at least one processor): based at least on the receiver node being time synchronized with the transmitter node to apply Doppler corrections and the common reference frame, use Doppler null scanning (DNS) to determine DNS derived information, the DNS derived information including a bearing and the receiver node's relative position relative to the transmitter node; and/or output a position, navigation, and timing (PNT) solution based at least on the DNS derived information.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node velocity projection onto a Doppler null direction, and an amount of adjustment of the adjusted receiver frequency is proportional to a receiver node velocity projection onto the Doppler null direction. In some embodiments, the receiver node 104 is configured to determine a relative speed between the transmitter node 102 and the receiver node 104, and the receiver node 104 is configured to determine a direction that the transmitter node 102 is in motion and a velocity vector of the transmitter node 102.

In some embodiments, at least one of the transmitter node 102 and the receiver node 104 are in relative motion in two or three dimensions.

In some embodiments, the PNT solution is output by a PNT system 804 connected to the receiver node 104. In some embodiments, the PNT system is an assured PNT (APNT) system, and the PNT solution is an APNT solution.

In some embodiments, the receiver node may be further configured to (e.g., by use of at least one processor (e.g., 806)): time align at least the DNS derived information with sensor data as time aligned information; and perform sensor fusion on the time aligned information to determine the PNT solution as a fused PNT solution for the receiver node 104. In some embodiments, the performance of the sensor fusion on the time aligned information to determine the PNT solution as the fused PNT solution for the receiver node 104 includes performance of at least one integrity check on the time aligned information to exclude at least one source of a portion of the time aligned information from the fused PNT solution. In some embodiments, such PNT solution may be an APNT solution.

In some embodiments, the DNS derived information includes the bearing, the receiver node's relative position relative to the transmitter node 102, the receiver node's velocity, and the receiver node's acceleration.

In some embodiments, the receiver node 104 is further configured to (e.g., by use of at least one processor): compare the PNT solution with at least one other PNT solution to improve the PNT accuracy of at least one PNT system 804 or determine that one or more of the at least one PNT system 802 is being spoofed, each of the at least one other PNT solution associated with at least one PNT system 802.

In some embodiments, the receiver node 104 is further configured to (e.g., by use of at least one processor (e.g., 806)): compare the PNT solution with at least one global positioning system (GPS) PNT solution to improve the PNT accuracy compared to using GPS alone or determine that at least one GPS is being spoofed or jammed.

In some embodiments, the receiver node 104 further comprises at least one PNT sensor 802, wherein each 802 of the at least one PNT sensor 802 is configured to provide sensor data for use as at least one given PNT input, wherein the receiver node 104 is further configured to (e.g., by use of at least one processor (e.g., 806)) compare the PNT solution against each of the at least one given PNT input to improve the accuracy of the at least one PNT system 802 or to determine whether any 802 of the at least one PNT sensor 802 has an erroneous given PNT input. In some embodiments, the at least one PNT sensor 802 includes at least one of a global positioning system (GPS), an inertial reference system (IRS), an inertial measurement unit (IMU), a barometer, a compass, a map, an optical sensor, or a radiofrequency sensor.

In some embodiments, the transmitter node transmission includes transmitter node position information from the transmitter node, wherein the transmitter node position information is associated with a position of the transmitter node 102; and the receiver node 104 is further configured to (e.g., by use of at least one processor (e.g., 806)) determine an absolute position of the receiver node 104 based at least on the transmitter node position information and the relative position of the receiver node 104. In some embodiments, the receiver node 104 lacks a global positioning system (GPS), wherein the transmitter node has a GPS. In some embodiments, the receiver node has a global positioning system (GPS), wherein the transmitter node has a more advanced GPS than the GPS of the receiver node. In some embodiments, the receiver node 104 may be an air launched effect (ALE).

Referring now to FIG. 9, an exemplary flow diagram for a processor(s)-performed sensor fusion process 900 is shown according to the inventive concepts disclosed herein. For example, sensor data from multiple PNT sensors 802 (e.g., at least one of which may utilize DNS) may be time aligned, as shown in block 902. For example, as shown in block 904, at least one processor may perform sensor fusion on time aligned information to determine a PNT solution as a fused PNT solution (e.g., a fused APNT solution) for the receiver node 104. The sensor fusion process 900 may also include distribution, as shown in block 906, of the PNT solution to other devices (e.g., serial data consumers 908, 910, ethernet consumers 912, alternate consumers 914, and/or a human machine interface(s) (HMI) 916 (e.g., which may include a keyboard, display (e.g., a touchscreen display), speaker, and/or microphone), any or all of which may be implemented as computing devices having at least one processor).

Referring now to FIG. 10, an exemplary embodiment of a method 1000 according to the inventive concepts disclosed herein may include one or more of the following steps. Additionally, for example, some embodiments may include performing one or more instances of the method 1000 iteratively, concurrently, and/or sequentially. Additionally, for example, at least some of the steps of the method 1000 may be performed in parallel and/or concurrently. Additionally, in some embodiments, at least some of the steps of the method 1000 may be performed non-sequentially.

A step 1002 may include providing a receiver node, comprising: a communications interface including at least one antenna element; and a controller operatively coupled to the communications interface, the controller including one or more processors, wherein the receiver node is time synchronized with a transmitter node to apply Doppler corrections to the receiver node's own motions relative to a common reference frame, wherein the common reference frame is known to the receiver node and the transmitter node prior to the transmitter node transmitting signals to the receiver node and prior to the receiver node receiving the signals from the transmitter node.

A step 1004 may include based at least on the receiver node being time synchronized with the transmitter node to apply Doppler corrections and the common reference frame, using, by the receiver node, Doppler null scanning (DNS) to determine DNS derived information, the DNS derived information including a bearing and the receiver node's relative position relative to the transmitter node.

A step 1006 may include outputting, by the receiver node, a position, navigation, and timing (PNT) solution based at least on the DNS derived information.

Further, the method 1000 may include any of the operations disclosed throughout.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:
1. A system, comprising:
a receiver node, comprising:
a communications interface including at least one antenna element; and
a controller operatively coupled to the communications interface, the controller including one or more processors;
wherein the receiver node is time synchronized with a transmitter node to apply Doppler corrections to the receiver node's own motions relative to a common reference frame,
wherein the common reference frame is known to the receiver node and the transmitter node prior to the transmitter node transmitting signals to the receiver node and prior to the receiver node receiving the signals from the transmitter node,
wherein the receiver node is configured to:
based at least on the receiver node being time synchronized with the transmitter node to apply Doppler corrections and the common reference frame, use Doppler null scanning (DNS) to determine DNS derived information, the DNS derived information including a bearing and the receiver node's relative position relative to the transmitter node; and
output a position, navigation, and timing (PNT) solution based at least on the DNS derived information.
2. The system of claim 1, wherein the transmitter node is configured to adjust a transmit frequency according to an own speed and an own velocity direction of the transmitter node so as to perform a transmitter-side Doppler correction.

3. The system of claim 2, wherein the receiver node is configured to adjust a receiver frequency of the receiver node according to an own speed and an own velocity direction of the receiver node so as to perform a receiver-side Doppler correction.

4. The system of claim 3, wherein an amount of adjustment of the adjusted transmit frequency is proportional to a transmitter node velocity projection onto a Doppler null direction, wherein an amount of adjustment of the adjusted receiver frequency is proportional to a receiver node velocity projection onto the Doppler null direction.

5. The system of claim 4, wherein the receiver node is configured to determine a relative speed between the transmitter node and the receiver node, wherein the receiver node is configured to determine a direction that the transmitter node is in motion and a velocity vector of the transmitter node.

6. The system of claim 1, wherein at least one of the transmitter node and the receiver node are in motion in two or three dimensions.

7. The system of claim 1, wherein the PNT solution is output by a PNT system of the receiver node.

8. The system of claim 7, wherein the PNT system is an assured PNT (APNT) system, wherein the PNT solution is an APNT solution.

9. The system of claim 1, wherein the receiver node is further configured to:
 time align at least the DNS derived information with sensor data as time aligned information; and
 perform sensor fusion on the time aligned information to determine the PNT solution as a fused PNT solution for the receiver node.

10. The system of claim 9, wherein the performance of the sensor fusion on the time aligned information to determine the PNT solution as the fused PNT solution for the receiver node includes performance of at least one integrity check on the time aligned information to exclude at least one source of a portion of the time aligned information from the fused PNT solution.

11. The system of claim 1, wherein the DNS derived information includes the bearing, the receiver node's relative position relative to the transmitter node, the receiver node's velocity, and the receiver node's acceleration.

12. The system of claim 1, wherein the receiver node is further configured to: compare the PNT solution with at least one other PNT solution to determine that one or more of the at least one PNT sensor is being spoofed, each of the at least one other PNT solution associated with at least one PNT system.

13. The system of claim 1, wherein the receiver node is further configured to: compare the PNT solution with at least one global positioning system (GPS) PNT solution to improve an accuracy of the GPS solution or to determine that at least one GPS is being spoofed or jammed.

14. The system of claim 1, wherein the receiver node further comprises at least one PNT sensor, wherein each of the at least one PNT sensor is configured to provide sensor data for use as at least one given PNT input, wherein the receiver node is further configured to compare the PNT solution against each of the at least one given PNT input to improve the accuracy of the PNT output or determine whether any of the at least one PNT sensor has an erroneous given PNT input.

15. The system of claim 14, wherein the at least one PNT sensor comprises at least one of a global positioning system (GPS), an inertial reference system (IRS), an inertial measurement unit (IMU), a barometer, a compass, a map, an optical sensor, or an radiofrequency sensor.

16. The system of claim 1, wherein the transmitter node transmission includes transmitter node position information from the transmitter node, wherein the transmitter node position information is associated with a position of the transmitter node; wherein the receiver node is further configured to determine an absolute position of the receiver node based at least on the transmitter node position information and the relative position of the receiver node.

17. The system of claim 16, wherein the receiver node lacks a global positioning system (GPS), wherein the transmitter node has a GPS.

18. The system of claim 16, wherein the receiver node has a global positioning system (GPS), wherein the transmitter node has a more advanced GPS than the GPS of the receiver node.

19. The system of claim 16, wherein the receiver node is an air launched effect (ALE).

20. A method, comprising:
 providing a receiver node, comprising:
  a communications interface including at least one antenna element; and
  a controller operatively coupled to the communications interface, the controller including one or more processors, wherein the receiver node is time synchronized with a transmitter node to apply Doppler corrections to the receiver node's own motions relative to a common reference frame, wherein the common reference frame is known to the receiver node and the transmitter node prior to the transmitter node transmitting signals to the receiver node and prior to the receiver node receiving the signals from the transmitter node;
 based at least on the receiver node being time synchronized with the transmitter node to apply Doppler corrections and the common reference frame, using, by the receiver node, Doppler null scanning (DNS) to determine DNS derived information, the DNS derived information including a bearing and the receiver node's relative position relative to the transmitter node; and
 outputting, by the receiver node, a position, navigation, and timing (PNT) solution based at least on the DNS derived information.

\* \* \* \* \*